United States Patent
Ono et al.

(10) Patent No.: US 8,580,155 B2
(45) Date of Patent: Nov. 12, 2013

(54) METHOD FOR PRODUCING ELECTRODE MATERIAL, ELECTRODE MATERIAL, ELECTRODE AND BATTERY

(75) Inventors: Koji Ono, Tokyo (JP); Atsushi Honda, Tokyo (JP); Tadashi Matsushita, Tokyo (JP); Mitsumasa Saito, Tokyo (JP)

(73) Assignee: Sumitomo Osaka Cement Co., Ltd. (JP)

( * ) Notice: Subject to any disclaimer, the term of this patent is extended or adjusted under 35 U.S.C. 154(b) by 314 days.

(21) Appl. No.: 13/060,849

(22) PCT Filed: Sep. 3, 2008

(86) PCT No.: PCT/JP2008/065828
§ 371 (c)(1),
(2), (4) Date: Feb. 25, 2011

(87) PCT Pub. No.: WO2010/026627
PCT Pub. Date: Mar. 11, 2010

(65) Prior Publication Data
US 2011/0163272 A1   Jul. 7, 2011

(51) Int. Cl.
*H01B 1/04* (2006.01)
*H01B 1/06* (2006.01)
*H01M 4/13* (2010.01)

(52) U.S. Cl.
USPC .................. 252/502; 252/506; 429/212

(58) Field of Classification Search
USPC .................. 252/521.2, 502, 506; 429/212
See application file for complete search history.

(56) References Cited

U.S. PATENT DOCUMENTS

| | | | |
|---|---|---|---|
| 5,976,489 A * | 11/1999 | Saidi et al. ............ | 423/599 |
| 8,492,031 B2 * | 7/2013 | Suzuki et al. .......... | 429/231.5 |
| 2003/0129497 A1 * | 7/2003 | Yamamoto et al. ....... | 429/246 |
| 2004/0013943 A1 * | 1/2004 | Stoker et al. ........... | 429/231.95 |
| 2004/0033360 A1 * | 2/2004 | Armand et al. ......... | 428/408 |
| 2005/0089740 A1 | 4/2005 | Moon et al. | |
| 2005/0285080 A1 | 12/2005 | Suzuki et al. | |
| 2008/0166474 A1 | 7/2008 | Deguchi et al. | |

(Continued)

FOREIGN PATENT DOCUMENTS

| | | |
|---|---|---|
| EP | 1 288 160 A1 | 3/2003 |
| JP | 2000-353644 A | 12/2000 |

(Continued)

OTHER PUBLICATIONS

Japanese Office Action from Application No. JP-2007-157681 mailed Jul. 3, 2012.

(Continued)

*Primary Examiner* — Randy Gulakowski
*Assistant Examiner* — Jaison Thomas
(74) *Attorney, Agent, or Firm* — Merchant & Gould P.C.

(57) ABSTRACT

Disclosed is a method for producing an electrode material which has high discharge capacity at high charge/discharge rate and enables to realize sufficient charge/discharge rate performance. Also disclosed are an electrode material, an electrode and a lithium ion battery. Specifically disclosed is a method for producing an electrode material, which is characterized in that a slurry containing an electrode active material or a precursor of the electrode active material, and organic compounds each selected from at least two groups among the group A, group B and group C is sprayed and dried for forming a granule, and the thus-formed granule is fired at a temperature not less than 500° C. but not more than 1000° C. in a non-oxidizing atmosphere.

13 Claims, 1 Drawing Sheet

(56) References Cited

U.S. PATENT DOCUMENTS

| | | | |
|---|---|---|---|
| 2010/0075229 A1* | 3/2010 | Atsuki et al. | 429/231.8 |
| 2010/0261061 A1 | 10/2010 | Yuasa et al. | |
| 2012/0040249 A1* | 2/2012 | Sheem et al. | 429/231.8 |
| 2012/0077087 A1* | 3/2012 | Cho et al. | 429/219 |

FOREIGN PATENT DOCUMENTS

| | | |
|---|---|---|
| JP | A-2001-015114 | 1/2001 |
| JP | 2003-157851 A | 5/2003 |
| JP | 2004-14340 | 1/2004 |
| JP | 2004-14341 | 1/2004 |
| JP | 2005-276609 | 10/2005 |
| JP | 2005-285382 | 10/2005 |
| JP | A-2006-261061 | 9/2006 |
| JP | A-2006-339184 | 12/2006 |
| JP | 2007-48692 | 2/2007 |
| JP | 2007095495 A * | 4/2007 |
| JP | 2008-044816 A | 2/2008 |
| JP | 2008-186732 | 8/2008 |
| KR | 100774263 B1 | 11/2007 |
| WO | WO 2007/094240 | 8/2007 |

OTHER PUBLICATIONS

European Search Report for European Patent Application No. 08 80 9883 (mailed Oct. 17, 2012).

* cited by examiner

METHOD FOR PRODUCING ELECTRODE MATERIAL, ELECTRODE MATERIAL, ELECTRODE AND BATTERY

This application is a U.S. National Stage Application under 35 U.S.C. §371 of International Patent Application No. of PCT/JP2008/065828, filed 3 Sep. 2008, the disclosure of which is hereby incorporated by reference in its entirety. The International Application was published in Japanese on 11 Mar. 2010 as WO 2010/026627.

TECHNICAL FIELD

The present invention relates to a method for producing an electrode material, an electrode material, an electrode, and a battery, and particularly to a method for producing an electrode material suitable for a positive electrode material for a battery, and, furthermore, a positive electrode material for a lithium ion battery, an electrode material produced by the above method, a positive electrode formed using the above electrode material, and a battery including the above positive electrode.

BACKGROUND

In recent years, as a battery expected to be miniaturized, weight-reduced and capacity-increased, a non-aqueous electrolyte-based secondary battery, such as a lithium ion battery, has been suggested and provided for practical uses.

The lithium ion battery includes a positive electrode and a negative electrode, which are capable of reversibly extracting and inserting lithium ions, and a non-aqueous electrolyte.

As a negative electrode material of a lithium ion battery, a Li-containing metal oxide capable of reversibly extracting and inserting lithium ions, such as, in general, a carbon-based material or a lithium titanium oxide ($Li_4Ti_5O_{12}$), is used as a negative electrode active material.

On the other hand, as a positive electrode material of a lithium ion battery, a Li-containing metal oxide capable of reversibly extracting and inserting lithium ions, such as lithium iron phosphate ($LiFePO_4$), or an electrode material mixture including a binder or the like, is used as a positive electrode active material. In addition, the positive electrode of a lithium ion battery is formed by coating the electrode material mixture on the surface of a metal foil, called a collector.

Compared with conventional secondary batteries, such as lead batteries, nickel cadmium batteries, nickel hydrogen batteries and the like, lithium ion batteries are used as power supplies for portable electronic devices, such as mobile phones and notebook-type personal computers due to the light weight, small size and high energy thereof. In addition, recently, lithium ion batteries has been studied as high-output power supplies for electric vehicles, hybrid vehicles, electric power tools and the like, and, in order to be used as high-output power supplies for them, the batteries need to have high-speed charging and discharging characteristics. However, an electrode active material, for example, an electrode material including a Li-containing metal oxide capable of reversibly extracting and inserting lithium ions has a problem of low electronic conductivity.

Therefore, as a method to improve the electronic conductivity of an electrode material, it is disclosed that, for example, a plurality of primary particles consisting of an empirical formula of $Li_xA_yB_zPO_4$ (herein, A is at least one selected from Cr, Mn, Fe, Co, Ni and Cu; B is at least one selected from Mg, Ca, Sr, Ba, Ti, Zn, B, Al, Ga, In, Si, Ge, Sc, Y and rare earth elements, and $0 \le x < 2$, $0 < y < 1.5$, $0 \le z < 1.5$) are collected so as to form a secondary particle, and carbon is interposed between the primary particles as an electron conductive material (refer to, for example, Patent Citations 1 and 2).

Patent Citation 1: Japanese Unexamined Patent Application Publication No. 2004-014340
Patent Citation 2: Japanese Unexamined Patent Application Publication No. 2004-014341

DETAILED DESCRIPTION

Technical Problem

However, in the method in which a plurality of primary particles consisting of the above empirical formula of $Li_xA_yB_zPO_4$ are collected so as to form a secondary particle, and carbon is interposed between the primary particles, the carbon content needs to be high to provide sufficient electronic conductivity. As a result, there are problems in that the amount of the electrode active material in an electrode material of $Li_xA_yB_zPO_4$, which is an electrode active material, and carbon, which is an electrical conductivity assisting agent that provides electronic conductivity, and furthermore, the amount of the electrode active material in an electrode material mixture including the electrode material, a binder and the like decrease, and a battery having a high discharge capacity and a sufficient charge and discharge rate performance during a high-speed charge and discharge process cannot be produced.

The present invention has been made in consideration of such problems, and the object of the present invention is to provide a method for producing an electrode material capable of realizing a high discharge capacity and a sufficient charge and discharge rate performance at a high-speed charge and discharge rate, an electrode material, an electrode and a battery.

Technical Solution

As a result of thorough studies to solve the above problems, the inventors of the present invention have found that an electrode material capable of realizing a sufficient charge and discharge rate performance can be produced by collecting a plurality of primary particles of an electrode active material so as to form a secondary particle, coating the surface of the primary particles with thin film-like carbon, and interposing the carbon between the primary particles, thereby increasing the electron-supplying capacity thereof, and have completed the present invention. That is, the inventors of the present invention have found that by using a mixture of plural kinds of organic compounds having different shapes, even with the same amount of carbon, an electrode material exhibiting a uniquely high electrical conductivity can be obtained, and have completed the present invention.

That is, the method for producing an electrode material according to the present invention is characterized by spraying and drying a slurry including an electrode active material or the precursor of an electrode active material and organic compounds selected respectively from at least two groups of the following group A, group B, and group C so as to produce a granule, and firing the granule in a non-oxidizing atmosphere at a temperature of from 500° C. to 1000° C.

Group A: polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, and polyvinyl acetate.

Group B: glucose, fructose, galactose, mannose, maltose, sucrose, lactose, glycogen, pectin, alginic acid, glucomannan, chitin, hyaluronic acid, chondroitin, and agarose.

Group C: polyether or multivalent alcohols except organic compounds belonging to the groups A and B.

The electrode active material preferably includes as the main component one selected from the group consisting of lithium cobaltate, lithium nickelate, lithium manganate, lithium titanate and compounds represented by the empirical formula of $Li_xA_yB_zPO_4$ (herein, A is one or two or more selected from the group consisting of Co, Mn, Ni, Fe, Cu and Cr; B is at least one or two or more selected from the group consisting of Mg, Ca, Sr, Ba, Ti, Zn, B, Al, Ga, In, Si, Ge, Sc, Y and rare earth elements, and $0 \leq x<2$, $0<y<1.5$, $0 \leq z<1.5$).

The electrode material according to the present invention is characterized by being produced by spraying and drying a slurry including an electrode active material or the precursor of an electrode active material and organic compounds selected respectively from at least two groups of the following group A, group B and group C so as to produce a granule, and firing the granule in a non-oxidizing atmosphere at a temperature of from 500° C. to 1000° C.

Group A: polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, and polyvinyl acetate.

Group B: glucose, fructose, galactose, mannose, maltose, sucrose, lactose, glycogen, pectin, alginic acid, glucomannan, chitin, hyaluronic acid, chondroitin, and agarose.

Group C: polyether or multivalent alcohols except organic compounds belonging to the groups A and B.

The electrode according to the present invention is characterized by being formed by using an electrode material produced by spraying and drying a slurry including an electrode active material or the precursor of an electrode active material and organic compounds selected respectively from at least two groups of the following group A, group B and group C so as to produce a granule, and firing the granule in a non-oxidizing atmosphere at a temperature of from 500° C. to 1000° C.

Group A: polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, and polyvinyl acetate.

Group B: glucose, fructose, galactose, mannose, maltose, sucrose, lactose, glycogen, pectin, alginic acid, glucomannan, chitin, hyaluronic acid, chondroitin, and agarose.

Group C: polyether or multivalent alcohols except organic compounds belonging to the groups A and B.

The battery according to the present invention is characterized by including as the positive electrode an electrode formed by using an electrode material produced by spraying and drying a slurry including an electrode active material or the precursor of an electrode active material and organic compounds selected respectively from at least two groups of the following group A, group B and group C so as to produce a granule, and firing the granule in a non-oxidizing atmosphere at a temperature of from 500° C. to 1000° C.

Group A: polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, and polyvinyl acetate.

Group B: glucose, fructose, galactose, mannose, maltose, sucrose, lactose, glycogen, pectin, alginic acid, glucomannan, chitin, hyaluronic acid, chondroitin, and agarose.

Group C: polyether or multivalent alcohols except organic compounds belonging to the groups A and B.

Advantageous Effects

According to the method for producing an electrode material according to the present invention, it is possible to provide an electrode material capable of realizing a high discharge capacity and a sufficient charge and discharge rate performance during a high-speed charge and discharge process since the electrode material is produced by spraying and drying a slurry including an electrode active material or the precursor of an electrode active material and organic compounds selected respectively from at least two groups of the following group A, group B and group C so as to produce a granule, and firing the granule in a non-oxidizing atmosphere at a temperature of from 500° C. to 1000° C.

EXPLANATION OF REFERENCE

1: PRIMARY PARTICLES
2: CARBON
3: SECONDARY PARTICLE

The embodiments of the method for producing an electrode material, the electrode material, the electrode and the battery according to the present invention will be described.

Here, the embodiments are to describe the present invention in detail to make the gist of the present invention more easily understood, and, unless otherwise described, do not limit the present invention.

[First Embodiment of the Method for Producing an Electrode Material]

The first embodiment of the method for producing an electrode material according to the present invention is a method that synthesizes an electrode material by spraying and drying a slurry including an electrode active material and organic compounds selected respectively from at least two groups of the following group A, group B and group C so as to produce a granule, and firing the granule in a non-oxidizing atmosphere at a temperature of from 500° C. to 1000° C.

Here, organic compounds belonging to each of the group A, group B and group C are one or two or more selected from each group.

The organic compounds of the group A can include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, polyvinyl acetate and the like. Among these organic compounds, polyvinyl alcohol and polyacrylic acid are preferred since they can form a preferable carbon film with the addition of a small amount due to the excellent film-forming properties thereof.

The organic compounds of the group B can include glucose, fructose, galactose, mannose, maltose, sucrose, lactose, glycogen, pectin, alginic acid, glucomannan, chitin, hyaluronic acid, chondroitin, agarose and the like.

As the organic compounds of the group C, polyether or multivalent alcohols except organic compounds belonging to the groups A and B can be used, and examples thereof can include polyethylene glycol, polypropylene glycol, polyglycerin, glycerin and the like.

The electrode active material preferably includes as the main component one selected from the group consisting of lithium cobaltate, lithium nickelate, lithium manganate, lithium titanate and compounds represented by the empirical formula of $Li_xA_yB_zPO_4$ (herein, A is one or two or more selected from the group consisting of Co, Mn, Ni, Fe, Cu and Cr; B is at least one or two or more selected from the group consisting of Mg, Ca, Sr, Ba, Ti, Zn, B, Al, Ga, In, Si, Ge, Sc, Y and rare earth elements, and $0 \leq x < 2$, $0 < y < 1.5$, $0 \leq z < 1.5$).

From the standpoint of high discharge potential, abundant reserves, stability and the like, A is preferably Mn, Fe, Co and Ni; B is preferably Mg, Ca, Sr, Ti, Zn and Al.

Here, examples of the rare earth elements can include La, Ce, Pr, Nd, Pm, Sm, Eu, Gd, Tb, Dy, Ho, Er, Tm, Yb, Lu and the like.

As the compounds represented by the empirical formula of $Li_xA_yB_zPO_4$ ($Li_xA_yB_zPO_4$ powder), compounds produced by a conventional method, such as a solid-phase method, a liquid-phase method, a vapor-phase method and the like can be used.

Preferable examples of the compounds represented by the empirical formula of $Li_xA_yB_zPO_4$ can include compounds, for example, synthesized by feeding and thermally synthesizing a slurry-like mixture obtained by mixing an Li source selected from a group consisting of a lithium salt, such as lithium acetate ($LiCH_3COO$), lithium chloride (LiCl) and the like, and lithium hydroxide (LiOH), a divalent iron salt, such as iron (II) chloride ($FeCl_2$), iron (II) acetate ($Fe(CH_3COO)_2$) and the like, a phosphate compound, such as phosphoric acid ($H_3PO_4$), ammonium phosphate ($NH_4H_2PO_4$), diammonium hydrogen phosphate (($NH_4)_2HPO_4$) and the like, and water in an airtight pressure-resistant container; washing the obtained sediment with water so as to produce a cake-like precursor material; and firing the cake-like precursor material.

In addition, the $Li_xA_yB_zPO_4$ powder may be either crystalline particles or amorphous particles, and also may be a mixture of crystalline and amorphous particles. The reason why the $Li_xA_yB_zPO_4$ powder may also be amorphous particles is that amorphous $Li_xA_yB_zPO_4$ powder is crystallized when thermally treated in a non-oxidizing atmosphere at a temperature of from 500° C. to 1000° C.

The size of the $Li_xA_yB_zPO_4$ powder is not particularly limited, but the average particle diameter of the primary particles is preferably from 0.01 μm to 20 μm, and more preferably from 0.02 μm to 5 μm.

With an average particle diameter of the primary particles of less than 0.01 μm, it becomes difficult to sufficiently coat the surface of the primary particles with thin film-like carbon, therefore the discharge capacity during a high-speed charge and discharge process decreases, and thus it becomes difficult to realize a sufficient charge and discharge rate performance. On the other hand, if the average particle diameter of the primary particles exceeds 20 μm, the resistance inside the primary particles increases, therefore the discharge capacity during a high-speed charge and discharge process becomes insufficient.

Furthermore, the shape of the $Li_xA_yB_zPO_4$ powder is not particularly limited, but is preferably spherical, and more preferably truly spherical since it is easy to produce an electrode material made of spherical, in particular, truly spherical, secondary particles.

The reason why the preferable shape of an electrode material is spherical is that it is possible to decrease the amount of a solvent when preparing a paste for producing a positive electrode by mixing the electrode material, a binder resin (binding agent) and the solvent, and also the coating of the paste for producing a positive electrode to a collector becomes easy.

In addition, if the shape of the electrode material is spherical, the surface area of the electrode material becomes minimized, and the mixing amount of a binder resin (binding agent) added to an electrode material mixture can be minimized, therefore, it is possible to decrease the internal resistance of the obtained positive electrode. Furthermore, since a spherical shape is easy to pack more densely, the amount of the positive electrode material packed per unit volume becomes large, and thus the electrode density can be increased, therefore it is possible to provide a high-capacity lithium ion battery.

The mixture ratio of the electrode active material to the organic compounds of the group A, group B and group C is preferably from 0.1 parts by mass to 30 parts by mass of carbon with respect to 100 parts by mass of the electrode active material when converting the amount of the organic compounds of the group A, group B and group C to the amount of carbon.

With a mixture ratio of carbon of less than 0.1 parts by mass, the discharge capacity during a high-speed charge and discharge process decreases, and thus it becomes difficult to realize a sufficient charge and discharge rate performance. On the other hand, if the mixture ratio of carbon exceeds 30 parts by mass, the mixture ratio of the electrode active material decreases, and thus, in the case of forming a battery, the capacity of the battery becomes low.

In addition, a preferable mixture ratio of an organic compound belonging to the group A, an organic compound belonging to the group B and an organic compound belonging to the group C is as follows:

That is, when $C_A$ represents the amount of carbon generated by thermally treating an organic compound belonging to the group A; $C_B$ represents the amount of carbon generated by thermally treating an organic compound belonging to the group B; and $C_C$ represents the amount of carbon generated by thermally treating an organic compound belonging to the group C, a value obtained by subtracting the minimum amount of carbon (weight-converted, with a condition of not zero) among the amounts of carbon $C_A$, $C_B$ and $C_C$ from the total amount of carbon (equivalent to the amount of carbon $C_A+C_B+C_C$, weight-converted) is preferably made to be 0.05 or more.

Regarding an organic compound from a group with the minimum mixing amount, the above value of less than 0.05 means that the method does not use plural kinds of organic compounds with different shapes, but rather that the method uses substantially only one kind of organic compound.

The electrode active material and the organic compounds selected respectively from at least two groups of the group A, group B and group C are dissolved or dispersed in water so as to prepare a uniform slurry.

The method for dispersing the electrode active material and the organic compounds of the group A, group B and group C in water is not particularly limited as long as it is a method that disperses the electrode active material and dissolves or disperses the organic compounds of the group A, group B and group C, but, for example, a method using a medium stirringtype dispersing apparatus that can stir medium particles at a high speed, such as a planetary ball mill, a vibrating ball mill, a beads mill, a paint shaker, an attritor and the like, is preferred.

At this time, it is preferable to disperse the electrode active material into the primary particles and to stir the organic compounds of the group A, group B and group C so as to be dissolved. Thereby, the surface of the primary particles of the electrode active material is coated with the organic compounds of the group A, group B and group C, and, consequently, carbon derived from the organic compounds of the group A, group B and group C is uniformly interposed between the primary particles of the electrode active material.

Next, the slurry is sprayed and dried in a high-temperature atmosphere, for example, in the atmosphere with a temperature of from 70° C. to 250° C. so as to produce a granule.

The particle diameter of liquid droplets when spraying is preferably from 0.05 μm to 500 μm.

Subsequently, the granule is fired in a non-oxidizing atmosphere with a temperature of from 500° C. to 1000° C., and more preferably from 600° C. to 900° C. Thereby, the surface of the primary particles of the electrode active material is coated with carbon produced by the thermal decomposition of the organic compounds of the group A, group B and group C so as to obtain an electrode material made of the secondary particles, in which the carbon has been interposed between the primary particles of the electrode active material.

With a firing temperature of the granule of less than 500° C., the decomposition and reaction of the organic compounds of the group A, group B and group C do not proceed sufficiently, and the carbonization of the organic compounds is insufficient, thereby producing a highly-resistant decomposed material of the organic compounds. On the other hand, if the firing temperature of the granule exceeds 1000° C., Li in the electrode active material is vaporized, which leads to not only the occurrence of compositional deviation, but also the acceleration of the grain growth of the electrode active material, therefore the discharge capacity during a high-speed charge and discharge process decreases, and thus a sufficient charge and discharge rate performance becomes difficult to realize.

In addition, as the non-oxidizing atmosphere when firing the granule, an inert atmosphere, such as $N_2$, Ar and the like, is preferable, and, in the case of further suppressing oxidation, a reductive atmosphere, such as an atmosphere including a reductive gas, such as $H_2$ and the like, is preferable.

[Second Embodiment of the Method for Producing an Electrode Material]

The second embodiment of the method for producing an electrode material according to the present invention is a method that synthesizes an electrode material by spraying and drying a slurry including the precursor of an electrode active material and organic compounds selected respectively from at least two groups of the above group A, group B and group C so as to produce a granule, and firing the granule in a non-oxidizing atmosphere at a temperature of from 500° C. to 1000° C.

Here, the precursor of the electrode active material refers to an intermediate raw material obtained by, for example, thermally treating a mixture of each raw material component of the electrode active material, which is not yet an ultimate electrode active material.

Among electrode active materials, as the precursor of the compounds represented by the empirical formula of $Li_xA_yB_zPO_4$, an intermediate material obtained by thermally treating a mixture of Li source, A source (here, A is one, or more selected from the group consisting of Co, Mn, Ni, Fe, Cu and Cr), B source (B is one, or more selected from the group consisting of Mg, Ca, Sr, Ba, Ti, Zn, B, Al, Ga, In, Si, Ge, Sc, Y and rare earth elements), $PO_4$ source and water is used.

Examples of methods for producing the intermediate material can include a method that feeds and hydrothermally synthesizes the mixture in an airtight pressure-resistant container, washes the obtained sediment with water so as to produce a cake-like material, and a method that sprays and dries the mixture in a high-temperature atmosphere so as to produce a granule.

In addition, the raw materials used to produce the precursor of the electrode active material are not particularly limited as long as they are combinations from which the target material can be obtained by a general hydrothermal method, but an acetate salt, a sulfate salt, a chloride and the like, which are soluble in water, are preferred because they can react in water.

Examples of the Li source can include lithium inorganic acid salts, such as lithium chloride (LiCl), lithium bromide (LiBr), lithium carbonate ($Li_2CO_3$), lithium nitrate ($LiNO_3$), lithium sulfate ($Li_2SO_4$), lithium phosphate ($Li_3PO_4$), lithium hydroxide (LiOH) and the like; and lithium organic acid salts, such as lithium acetate ($LiCH_3COO$), lithium oxalate (($COOLi)_2$) and the like; lithium alkoxides, such as lithium ethoxide ($LiC_2H_5O$); and Li-containing organic metal compounds, such as organic lithium compounds, such as ($Li_4(CH_3)_4$) and the like.

Preferable examples of the A source can include compounds including one or more of element(s) selected from the group consisting of Co, Mn, Ni, Fe, Cu and Cr, and, in particular, compounds including one or more of element (s) selected from Mn, Fe, Co and Ni are preferred from the standpoint of high discharge potential, abundant reserves, stability and the like.

Examples of such compounds can include, as Fe components, iron (II) sulfate ($FeSO_4$), iron (II) acetate ($Fe(CH_3COO)_2$), iron (II) chloride ($FeCl_2$) and the like.

Preferable examples of the B source can include compounds including elements, which are different from the A source and one or more of elements selected from the group of Mg, Ca, Sr, Ba, Ti, Zn, B, Al, Ga, In, Si, Ge, Sc, Y and rare earth elements, and, in particular, compounds including one or more element(s) selected from Mg, Ca, Sr, Ti, Zn and Al are preferred from the standpoint of high discharge potential, abundant reserves, stability and the like.

Here, examples of the rare earth elements can include La, Ce, Pr, Nd, Pm, Sm, Eu, Gd, Tb, Dy, Ho, Er, Tm, Yb, Lu and the like.

As such compounds, one or more of the metal salt(s) of elements that are from the above elements, but different from the A source can be used, and preferable examples thereof can include sulfates, such as magnesium sulfate ($MgSO_4$), titanium sulfate ($Ti(SO_4)_2$) and the like; acetates such as magnesium acetate ($Mg(CH_3COO)_2$) and chlorides, such as calcium chloride ($CaCl_2$), titanium tetrachloride ($TiCl_4$) and the like.

Examples of the $PO_4$ source can include phosphoric acids, such as orthophosphoric acid ($H_3PO_4$), metaphosphoric acid ($HPO_3$) and the like; ammonium hydrogen phosphate, such as diammonium hydrogen phosphate (($NH_4)_2HPO_4$), ammonium dihydrogen phosphate ($NH_4H_2PO_4$) and the like; and the like.

Among the above, from the standpoint of relatively high purity and ease of conducting a composition control, orthophosphoric acid, diammonium hydrogen phosphate, ammonium dihydrogen phosphate and the like are preferred.

In the second embodiment, an electrode material is synthesized in the same manner as in the first embodiment except that, instead of the electrode active material, a precursor of the electrode active material is used.

As such, according to the first and second embodiments of the method for producing an electrode material according to the present invention, a slurry, in which an electrode active material or the precursor thereof and organic compounds selected respectively from at least two groups of the above group A, group B and group C are uniformly dispersed in water, is sprayed as fine liquid droplets and dried so as to produce a granule, and the granule is fired, which makes thermal decomposition of the organic compounds occur instantly, thereby forming an electrode material made of secondary particles having carbon interposed between the primary particles of the electrode active material.

In addition, by mixing an electrode active material or the precursor thereof and organic compounds selected respectively from at least two groups of the group A, group B and group C, it becomes easy to design the thickness, shape and electrical conducting property of a carbon film that coats the electrode active material due to carbon derived from the organic compounds.

That is, although it is not clear why the electrical conducting property is uniquely improved by mixing an electrode active material or the precursor thereof and a plurality of the organic compounds, it is considered that, for example, since the organic compound belonging to the group A has an excellent film-producing property, a carbon film can be easily formed on the surface of the electrode active material, and electrical conducting paths can be formed across an extensive range in the electrode material with a small amount of carbon. In addition, it is considered that the organic compound belonging to the group B can easily produce carbon even in a thermal decomposition reaction at a lower temperature and exhibits an excellent electrical conducting property. Furthermore, it is considered that the organic compound belonging to the group C improves the leaking property at the surface of the electrode active material; and improves the adhesion property between carbon derived from the organic compound belonging to the group A and/or carbon derived from the organic compound belonging to the group B and the electrode active material; and can dispose carbon derived from the organic compound belonging to the group A and/or carbon derived from the organic compound belonging to the group B on the surface of the electrode active material in an optimal shape (such as the thickness, coating rate, coated surface area, distance between a coated portion and an opening portion of a film). Therefore, when mixing organic compounds selected from plural groups, the effects imparted by these organic compounds are coupled, therefore, compared with a case in which one kind of the organic compound is used, the electrical conducting property of the electrode active material is uniquely improved.

Furthermore, in the obtained electrode material, since plural primary particles of the electrode active material coated with thin film-like carbon with a thickness of 50 nm or less are collected so as to form a secondary particle, and each primary particle is coated with carbon, part of the primary particles constituting the secondary particle, which are exposed outside, are also coated with thin film-like carbon, and the primary particles are joined to one another via the thin film-like carbon. Here, the expression 'the primary particles are joined to one another' does not refer to a state in which the primary particles constitute the secondary particle simply in an aggregation state, but refers to a state in which the secondary particle is strongly bonded so as to at least behave like one particle.

Figure 1:
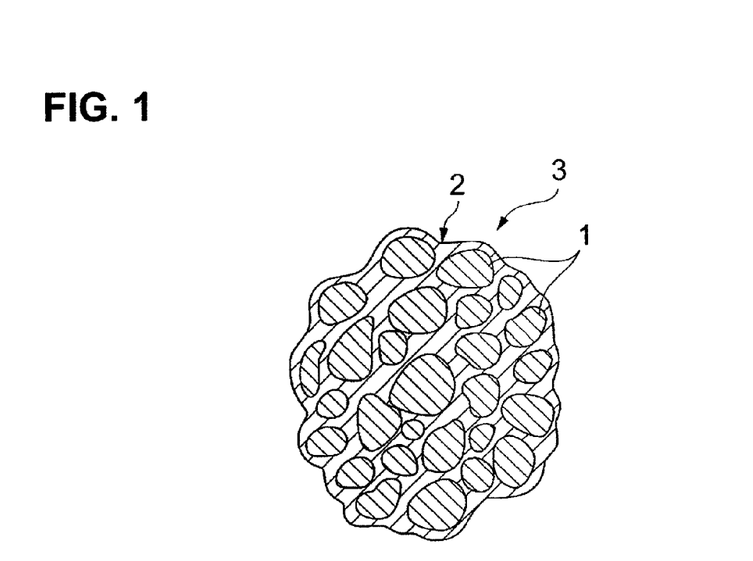
FIG. 1 is a cross-sectional view showing an electrode material obtained from first and second embodiments of the method for producing an electrode material according to the present invention.

FIG. 1 is a cross-sectional view showing an electrode material obtained by the first and second embodiments of the method for producing an electrode material according to the present invention, a plurality of the primary particles of an electrode active material are collected, and the primary particles 1 are joined to one another via thin layer-like carbon 2 in a three-dimensional network structure, thereby forming a secondary particle 3 with a spherical overall shape. Compared with electrode materials which are produced by other producing methods and have the same electrical conducting property, such an electrode material has a small amount of carbon interposed (coating the surface of the primary particles) between the primary particles of the electrode active material made of the compounds or the like represented by the empirical formula of $Li_xA_yB_zPO_4$. Therefore, since it is possible to increase the amount of an electrode material made of compounds represented by the empirical formula of $Li_xA_yB_zPO_4$, which are the electrode active material, and carbon, which is an electrical conductivity assisting agent that provides an electron-conducting property, and, furthermore, an electrode active material included in an electrode material mixture composed of an electrode material and a binder resin, a lithium ion battery produced by using the electrode material mixture has a high discharge capacity during a high-speed charge and discharge process and a sufficient charge and discharge rate performance.

[Electrode]

The electrode according to the present invention is an electrode formed by using the electrode material according to the present invention.

To produce the electrode according to the present invention, a coating material or a paste for producing a positive electrode is prepared by mixing the electrode material according to the present invention, a binder resin (binding agent) and a solvent. At this time, an electrical conductivity assisting agent, such as carbon black or the like, may be added as necessary.

Next, the coating material or paste for producing a positive electrode is coated and then dried on one surface of a metal foil, thereby obtaining the metal foil having the positive electrode active material maintained at one surface.

Subsequently, the positive electrode active material or the like maintained on one surface of the metal foil is pressed to be attached, and then dried, thereby producing a collector (positive electrode) having an electrode material layer.

Examples of the binder resin can include a polytetrafluoroethylene (PTFE) resin, polyvinylidene fluoride (PVdF) and the like.

The mixture ratio of the electrode material and the binder resin is not particularly limited, and, for example, about from 3 parts by mass to 20 parts by mass of the binder resin is mixed with regard to 100 parts by mass of the electrode material.

[Battery]

The battery according to the present invention is a battery including the electrode according to the present invention as the positive electrode.

The battery according to the present invention has no particular limitation on the negative electrode, electrolyte, separator, battery shape and the like.

The battery according to the present invention has a highly pure positive electrode and is formed with the electrode material according to the present invention, which is fine spherical particles with similar particle diameters, therefore the battery can have a high discharge capacity during a high-speed charge and discharge process and a stabilized charge and discharge cycle performance, and achieve a high output.

EXAMPLES

Hereinafter, the present invention will be described in detail with examples and comparative examples, but the present invention is not limited to the following examples.

Example 1

4 mol of lithium acetate ($LiCH_3COO$), 2 mol of iron (II) sulfate ($FeSO_4$), and 2 mol of phosphoric acid ($H_3PO_4$) were mixed in 2 L (liters) of water so as to have a total weight of 4 L (liters), thereby preparing a uniform slurry-like mixture.

Next, the mixture was stored in an airtight pressure-resistant container with a capacity of 8 L (liters) and hydrothermally synthesized at 120° C. for 1 hour. Then, the obtained sediment was washed with water, thereby obtaining a cake-like precursor of an electrode active material.

Subsequently, 150 g (solid state-converted) of the precursor of an electrode active material, and, as the organic compounds, 4 g of polyvinyl alcohol and 1.5 g of polyethylene glycol were dissolved in 150 g of water, mixed with 500 g of zirconia balls with a diameter of 5 mm as medium particles, and then dispersed by a ball mill for 12 hours, thereby preparing a uniform slurry.

Next, the slurry was sprayed and dried in the atmosphere at 180° C., thereby obtaining a granule with an average particle diameter of 6 μm.

The obtained granule was fired in a nitrogen atmosphere at 700° C. for 1 hour, thereby obtaining an electrode material (A1).

From an observation of the electrode material (A1) with a Scanning Electron Microscope (SEM) and a Transmission Electron Microscope (TEM), it was observed that plural primary particles were collected so as to form a secondary particle, and the surfaces of the primary particles were coated with thin film-like carbon, and carbon was interposed between the primary particles. In addition, the electrode material (A1) was a spherical body with an average particle diameter of 5 μm.

Example 2

An electrode material (A2) was obtained in the same manner as Example 1 except 4.8 g of glucose and 1.5 g of polyethylene glycol were used as the organic compounds.

From an observation of the electrode material (A2) with a Scanning Electron Microscope (SEM) and a Transmission Electron Microscope (TEM), it was observed that plural primary particles were collected so as to form a secondary particle, and the surfaces of the primary particles were coated with thin film-like carbon, and carbon was interposed between the primary particles. In addition, the electrode material (A2) was a spherical body with an average particle diameter of 5 μm.

Example 3

An electrode material (A3) was obtained in the same manner as Example 1 except 2 g of polyvinyl alcohol and 2.4 g of glucose were used as the organic compounds.

From an observation of the electrode material (A3) with a Scanning Electron Microscope (SEM) and a Transmission Electron Microscope (TEM), it was observed that plural primary particles were collected so as to form a secondary particle, and the surfaces of the primary particles were coated with thin film-like carbon, and carbon was interposed between the primary particles. In addition, the electrode material (A3) was a spherical body with an average particle diameter of 5 μm.

Example 4

An electrode material (A4) was obtained in the same manner as Example 1 except 4 g of polyvinyl alcohol and 2.0 g of polyglycerin were used as the organic compounds.

From an observation of the electrode material (A4) with a Scanning Electron Microscope (SEM) and a Transmission Electron Microscope (TEM), it was observed that plural primary particles were collected so as to form a secondary particle, and the surfaces of the primary particles were coated with thin film-like carbon, and carbon was interposed between the primary particles.

In addition, the electrode material (A4) was a spherical body with an average particle diameter of 5 μm.

Example 5

An electrode material (A5) was obtained in the same manner as Example 1 except 4 g of polyacrylic acid and 2.0 g of polyglycerin were used as the organic compounds.

From an observation of the electrode material (A5) with a Scanning Electron Microscope (SEM) and a Transmission Electron Microscope (TEM), it was observed that plural primary particles were collected so as to form a secondary particle, and the surfaces of the primary particles were coated with thin film-like carbon, and carbon was interposed between the primary particles. In addition, the electrode material (A5) was a spherical body with an average particle diameter of 5 μm.

Example 6

An electrode material (A6) was obtained in the same manner as Example 1 except 2 g of polyacrylic acid and 2.4 g of glucose were used as the organic compounds.

From an observation of the electrode material (A6) with a Scanning Electron Microscope (SEM) and a Transmission Electron Microscope (TEM), it was observed that plural primary particles were collected so as to form a secondary particle, and the surfaces of the primary particles were coated with thin film-like carbon, and carbon was interposed between the primary particles. In addition, the electrode material (A6) was a spherical body with an average particle diameter of 5 μm.

Example 7

An electrode material (A7) was obtained in the same manner as Example 1 except 2 g of polyvinyl acetate and 1.5 g of polyethylene glycol were used as the organic compounds.

From an observation of the electrode material (A7) with a Scanning Electron Microscope (SEM) and a Transmission Electron Microscope (TEM), it was observed that plural primary particles were collected so as to form a secondary particle, and the surfaces of the primary particles were coated with thin film-like carbon, and carbon was interposed between the primary particles. In addition, the electrode material (A7) was a spherical body with an average particle diameter of 5 μm.

Example 8

An electrode material (A8) was obtained in the same manner as Example 1 except 2 g of polyvinyl alcohol and 2.4 g of glucose were used as the organic compounds.

From an observation of the electrode material (A8) with a Scanning Electron Microscope (SEM) and a Transmission Electron Microscope (TEM), it was observed that plural primary particles were collected so as to form a secondary particle, and the surfaces of the primary particles were coated with thin film-like carbon, and carbon was interposed between the primary particles. In addition, the electrode material (A8) was a spherical body with an average particle diameter of 5 μm.

Example 9

4 mol of lithium acetate ($LiCH_3COO$), 2 mol of iron (II) sulfate ($FeSO_4$), and 2 mol of phosphoric acid ($H_3PO_4$) were mixed in 2 L (liters) of water so as to have a total weight of 4 L (liters), thereby preparing a uniform slurry-like mixture.

Next, the mixture was stored in an airtight pressure-resistant container with a capacity of 8 L (liters) and hydrothermally synthesized at 180° C. for 3 hour. Then, the obtained sediment was washed with water, thereby obtaining a cake-like electrode active material.

Subsequently, 150 g (solid state-converted) of the electrode active material ($LiFePO_4$), and, as the organic compounds, 4 g of polyvinyl alcohol and 1.5 g of polyethylene glycol were dissolved in 150 g of water, mixed with 500 g of zirconia balls with a diameter of 5 mm as medium particles, and then dispersed by a ball mill for 12 hours, thereby preparing an uniform slurry.

Next, the slurry was sprayed and dried in the atmosphere at 180° C., thereby obtaining a granule with an average particle diameter of 6 μm.

The obtained granule was fired in a nitrogen atmosphere at 700° C. for 1 hour, thereby obtaining an electrode material (A9).

From an observation of the electrode material (A9) with a Scanning Electron Microscope (SEM) and a Transmission Electron Microscope (TEM), it was observed that plural primary particles were collected so as to form a secondary particle, and the surfaces of the primary particles were coated with thin film-like carbon, and carbon was interposed between the primary particles. In addition, the electrode material (A9) was a spherical body with an average particle diameter of 5 μm.

Comparative Example 1

An electrode material (B1) was obtained in the same manner as Example 1 except 4 g of polyvinyl alcohol was used as the organic compound.

The electrode material (B1) was a spherical body with an average particle diameter of 5 μm.

Comparative Example 2

An electrode material (B2) was obtained in the same manner as Example 1 except 4.8 g of glucose was used as the organic compounds.

The electrode material (B2) was a spherical body with an average particle diameter of 5 μm.

[Evaluation of Electrode Material Powder]

The amount of carbon in the electrode material powders obtained from Examples 1 to 9 and Comparative Examples 1 and 2 was measured using a carbon analyzing apparatus (WC-200, trade name, manufactured by LECO Corporation)

In addition, the compact resistivity (electrical conduction property) of the electrode material powder was measured by a four-terminal method at 25° C. using a low resistivity meter (LORESTA-GP, trade name, manufactured by Mitsubishi Chemical Corporation). Here, specimens for the measurement of the compact resistivity were formed with a pressure of 50 MPa.

The above results are shown in Table 1.

TABLE 1

| Specimen | Amount of carbon (% by mass) | Compact resistivity ($\Omega$ cm) |
| --- | --- | --- |
| Example 1 (A1) | 1.0 | $10^2$ |
| Example 2 (A2) | 1.1 | $10^1$ |
| Example 3 (A3) | 1.0 | $10^1$ |
| Example 4 (A4) | 1.0 | $10^2$ |
| Example 5 (A5) | 1.0 | $10^2$ |
| Example 6 (A6) | 1.1 | $10^1$ |
| Example 7 (A7) | 1.0 | $10^2$ |
| Example 8 (A8) | 1.1 | $10^1$ |
| Example 9 (A9) | 1.0 | $10^2$ |
| Comparative Example 1 (B1) | 1.0 | $10^4$ |
| Comparative Example 2 (B2) | 1.0 | $10^3$ |

From the results of Table 1, it was understood that the compact resistivity of the electrode materials (A1 to A9) of Examples 1 to 9 was significantly different from those of the electrode materials (B1 and B2) of Comparative Examples 1 and 2, and the electrical conducting property of the electrode materials (A1 to A9) of Examples 1 to 9 was high.

[Production of Batteries]

Lithium ion batteries were produced using the electrode materials obtained from Examples 1 to 3 and Comparative Examples 1 and 2.

90% by mass of the electrode material, 5% by mass of carbon black as an electrical conductivity assisting agent, 5% by mass of polyvinylidene fluoride (manufactured by Kureha Chemical Industry Co., Ltd.) as a binder resin and N-methyl-2-pyrrolidone as a solvent were mixed so as to prepare a paste for producing a positive electrode.

Next, the paste for producing a positive electrode was coated and dried on one surface of an aluminum (Al) foil so as to obtain an aluminum foil having a positive electrode active material maintained at one surface.

Subsequently, after the positive electrode active material maintained at one surface of the aluminum foil and the like was punched out, a disk-shaped hole with a diameter of 16 mm was made on the aluminum foil and dried under vacuum so as to produce a collector (positive electrode) including an electrode material layer with a thickness of 60 μm and a density of 2.2 $g/cm^2$.

Next, a lithium ion battery was produced using a stainless steel (SUS) 2016 coin-type cell under a dried argon (Ar) atmosphere.

Meanwhile, metallic lithium (Li), a porous polypropylene film and 1 mol/L $LiPF_6$ solution (solvent: ethylene carbonate/diethyl carbonate=1/1 (volume ratio)) were used respectively as a negative electrode, a separator, and an electrolyte solution.

[Battery Charge and Discharge Test]

The respective lithium ion batteries of Examples 1 to 3 and Comparative Examples 1 and 2 were subjected to a charge and discharge test.

The charge and discharge test was conducted with conditions of an environmental temperature of room temperature (25° C.), a cut-off voltage of from 2.0 V to 4.2 V, a charging rate of 0.2 C constant current and a discharging rate of from 0.1 C to 8 C.

Figure 2:
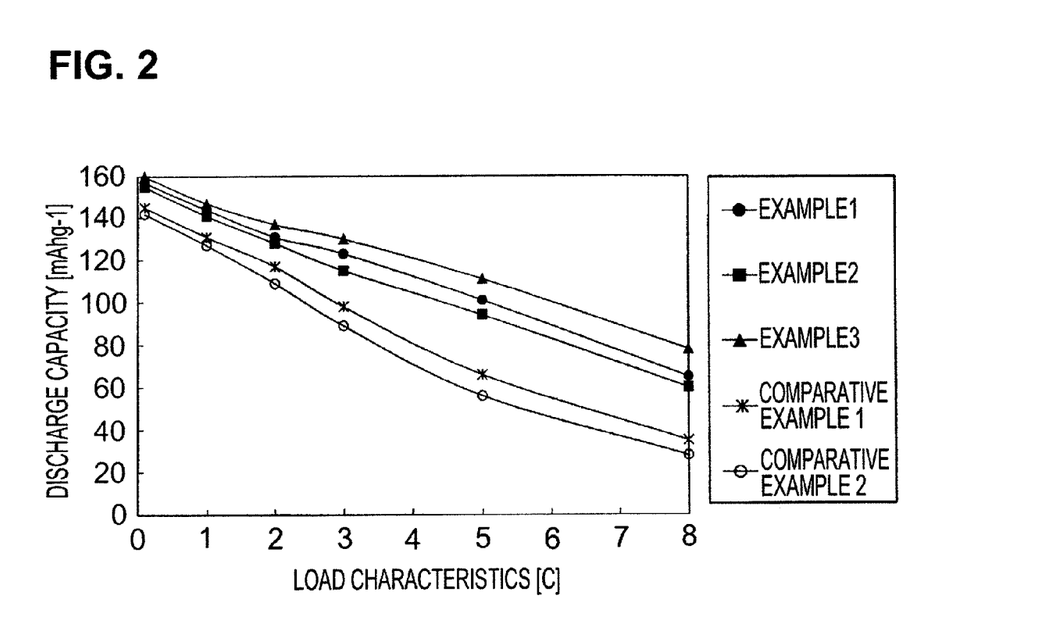
FIG. 2 is a graph showing the results of the charge and discharge test of each lithium ion battery of Embodiments 1 to 3 and Comparative Examples 1 and 2 of the present invention.

The results are shown in FIG. 2.

From the results of FIG. 2, it was understood that, compared with the lithium ion batteries using the electrode materials of Comparative Examples 1 and 2, the lithium ion batteries using the electrode materials of Examples 1 to 3 can realize a high discharge capacity across a range from a low-speed charge and discharge rate of 0.1 C to a high-speed charge and discharge rate of 8 C, and a sufficient charge and discharge rate performance.

Industrial Applicability

The method for producing an electrode material according to the present invention can obtain an electrode material made of secondary particles having carbon interposed between the primary particles of an electrode active material by spraying droplets as fine liquid and drying a slurry including the electrode active material or the precursor thereof, and organic compounds selected respectively from at least two groups of the above group A, group B and group C uniformly dispersed in water so as to produce a granule, and by firing the granule, therefore it is possible to further improve the charge and discharge capacity (particularly, discharge capacity) of a lithium ion battery, and to achieve the stabilization and high-output of charge and discharge cycles. In addition, it is also possible to apply the method to a next-generation secondary battery, which is expected to be further miniaturized, weight-reduced and capacity-increased, and therefore, the effects will become significantly larger in the case of a next-generation secondary battery.

The invention claimed is:

1. A method for producing an electrode material comprising:
    spraying and drying a slurry so as to produce a granule;
    firing the granule in a non-oxidizing atmosphere at a temperature of from 500 to 1000° C.,
    wherein the slurry includes an electrode active material or the precursor of an electrode active material and organic compounds selected respectively from at least two groups of the following group A, group B and group C:
    and Group A is polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide and polyvinyl acetate, and
    Group B is glucose, fructose, galactose, mannose, maltose, sucrose, lactose, glycogen, pectin, alginic acid, glucomannan, chitin, hyaluronic acid, chondroitin and agarose, and
    Group C is polyether or multivalent alcohols except organic compounds belonging to the groups A and B; and wherein the electrode material comprises primary particle of electrode active material coated with thin film-like carbon having a thickness of 50 nm or less.

2. The method for producing an electrode material according to claim 1,
    wherein the electrode active material includes as a main component one selected from the group consisting of lithium cobaltate, lithium nickelate, lithium manganate, lithium titanate and compounds represented by the empirical formula of $Li_xA_yB_zPO_4$;
    wherein A is one or more selected from the group consisting of Co, Mn, Ni, Fe, Cu and Cr; B is at least one or more selected from the group consisting of Mg, Ca, Sr, Ba, Ti, Zn, B, Al, Ga, In, Si, Ge, Sc, Y and rare earth elements, and $0 \leq x < 2$, $0 < y < 1.5$, and $0 \leq z < 1.5$.

3. The method of claim 1, wherein the slurry comprises at least one organic compound selected from Group C, wherein Group C comprises polyethylene glycol, polypropylene glycol, polyglycerin, and glycerin.

4. The method of claim 1, wherein the electrode material has a compact resistivity that is less than $10^3$ Ω·cm.

5. An electrode material produced by spraying and drying a slurry including an electrode active material or the precursor of an electrode active material and organic compounds selected respectively from at least two groups of the following group A, group B and group C so as to produce a granule and then firing the granule in a non-oxidizing atmosphere at a temperature of from 500° C. to 1000° C., wherein
    Group A is polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide and polyvinyl acetate,
    Group B is glucose, fructose, galactose, mannose, maltose, sucrose, lactose, glycogen, pectin, alginic acid, glucomannan, chitin, hyaluronic acid, chondroitin and agarose, and
    Group C is polyether or multivalent alcohols except organic compounds belonging to the groups A and B; and
    wherein the electrode material comprises primary particles of electrode active material coated with thin film-like carbon having a thickness of 50 nm or less.

6. The electrode material of claim 5, wherein the slurry comprises at least one organic compound selected from Group C, wherein Group C comprises polyethylene glycol, polypropylene glycol, polyglycerin, and glycerin.

7. The electrode material of claim 5, wherein the electrode material has a compact resistivity that is less than $10^3$ Ω·cm.

8. An electrode formed by using an electrode material produced by spraying and drying a slurry including an electrode active material or the precursor of an electrode active material and organic compounds selected respectively from at least two groups of the following group A, group B and group C so as to produce a granule and then firing the granule in a non-oxidizing atmosphere at a temperature of from 500° C. to 1000° C., wherein
    Group A is polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide and polyvinyl acetate,
    Group B is glucose, fructose, galactose, mannose, maltose, sucrose, lactose, glycogen, pectin, alginic acid, glucomannan, chitin, hyaluronic acid, chondroitin and agarose, and
    Group C is polyether or multivalent alcohols except organic compounds belonging to the groups A and B; and
    wherein the electrode material comprises primary particles of electrode active material coated with thin film-like carbon having a thickness of 50 nm or less.

9. The electrode of claim 8, wherein the slurry comprises at least one organic compound selected from Group C, wherein Group C comprises polyethylene glycol, polypropylene glycol, polyglycerin, and glycerin.

10. The electrode of claim 8, wherein the electrode material has a compact resistivity that is less than $10^3$ Ω·cm.

11. A battery comprising an electrode formed by using an electrode material produced by spraying and drying a slurry including an electrode active material or the precursor of an electrode active material and organic compounds selected respectively from at least two groups of the following group A, group B and group C so as to produce a granule and then firing the granule in a non-oxidizing atmosphere at a temperature of from 500° C. to 1000° C., wherein

- Group A is polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide and polyvinyl acetate,
- Group B is glucose, fructose, galactose, mannose, maltose, sucrose, lactose, glycogen, pectin, alginic acid, glucomannan, chitin, hyaluronic acid, chondroitin and agarose, and
- Group C is polyether or multivalent alcohols except organic compounds belonging to the groups A and B; and
- wherein the electrode material comprises primary particles of electrode active material coated with thin film-like carbon having a thickness of 50 nm or less.

12. The battery of claim 11, wherein the slurry comprises at least one organic compound selected from Group C, wherein Group C comprises polyethylene glycol, polypropylene glycol, polyglycerin, and glycerin.

13. The battery of claim 11, wherein the electrode material has a compact resistivity that is less than $10^3$ $\Omega \cdot cm$.

* * * * *